United States Patent
Martin

(10) Patent No.: US 7,680,309 B2
(45) Date of Patent: Mar. 16, 2010

(54) METHOD AND FUNCTIONAL UNIT FOR QUALITY MONITORING OF IMAGE ACQUISITIONS AND SIMULTANEOUS IMPLEMENTATION OF AN IMAGE PRE-PROCESSING AND GENERATION OF IMAGE PROCESSING OBJECTS (PRESENTATION STATES) USING PROGRESSIVE IMAGE COMPRESSION AND TRANSFER METHODS

(75) Inventor: Uwe-Erik Martin, Prötzel (DE)

(73) Assignee: Siemens Aktiengesellschaft, Munich (DE)

( * ) Notice: Subject to any disclaimer, the term of this patent is extended or adjusted under 35 U.S.C. 154(b) by 932 days.

(21) Appl. No.: 11/257,737

(22) Filed: Oct. 25, 2005

(65) Prior Publication Data

US 2007/0092119 A1  Apr. 26, 2007

(51) Int. Cl.
*G06K 9/00* (2006.01)

(52) U.S. Cl. .................................................. 382/128
(58) Field of Classification Search ......... 382/128–134; 128/920–930; 250/455–465; 356/39–49; 600/400–450; 378/1–90
See application file for complete search history.

(56) References Cited

U.S. PATENT DOCUMENTS 5,321,520 A * 6/1994 Inga et al. ................. 358/403
7,376,903 B2 * 5/2008 Morita et al. .............. 715/757

* cited by examiner

*Primary Examiner*—Samir A. Ahmed
*Assistant Examiner*—Atiba Fitzpatrick
(74) *Attorney, Agent, or Firm*—Schiff Hardin LLP

(57) ABSTRACT

A method is provided for simultaneously implementing an image preprocessing and storing of presentation states during a running image transfer by sending acquired image data, which may be in a low resolution format, to an image processing station where processing descriptions associated with the acquired image are assigned to the image data and stored along with the acquired image data in an image storage database for future access.

4 Claims, 1 Drawing Sheet

METHOD AND FUNCTIONAL UNIT FOR QUALITY MONITORING OF IMAGE ACQUISITIONS AND SIMULTANEOUS IMPLEMENTATION OF AN IMAGE PRE-PROCESSING AND GENERATION OF IMAGE PROCESSING OBJECTS (PRESENTATION STATES) USING PROGRESSIVE IMAGE COMPRESSION AND TRANSFER METHODS

BACKGROUND

In a medical image acquisition system such as a computer tomography (CT) system or nuclear magnetic resonance tomography (MR) system, the image quality of the generated image data must be examined immediately after its acquisition in order to repeat the acquisition if necessary. As illustrated in FIG. 1, an image acquisition system 12 acquires an image from an acquisition device 13 and a first image pre-processing 14 (such as a change of the image brightness or of the image contrast) simultaneously occurs directly on the acquisition apparatus 12 (modality). The acquired and prepared images 24, 24' are subsequently sent to a Picture Archival and Communications System (PACS) 20 and stored 22. The processing of the image acquisition and image distribution can often take several minutes.

From this point in time, further processing and appraisal of the acquired images ensues in predefined work steps that are established and monitored by a machine (workflow engine). These work steps are implemented on specially-equipped finding/image processing workstations 30 by different persons (such as radiologists) specially trained for the appraisal of medical images. The finding and image processing workstation 30 is generally one and the same, although in rare situations these may be separate (e.g., expensive 3D prepro- cessing hardware is available for only a few systems).

Due to the spatial, personal and temporal separation of the image acquisition and first pre-processing 12, 14 on the modality, and the finding inspection at the finding/image processing workstation 30, the pre-processing 14 on the modality requires particularly qualified personnel in order to ensure a qualified post-processing and finding description. A direct quality control and/or pre-processing of the image acquisition by the qualified radiologist on the finding workstation is not possible with present systems.

Due to the spatial separation of the image acquisition system 12 from the finding/image processing system 30 for the pre-processing of the images, the same image processing tools may not be available for the pre-processing 14 as are available on the finding workstations 30, or, if the same tools of the finding system 30 are separately provided for on the image acquisition system 12, there are additional costs.

This problem was previously solved by specially-trained personnel at the image acquisition apparatuses 12. These personnel had to ensure that the acquired images 24, 24' possessed a quality sufficient for the finding generation. In the event that this quality was not present, a complete repetition of the acquisition procedure would have to ensue again.

SUMMARY

The inventive embodiment enables a simultaneous, but spatially-separate, quality control of the data immediately present in the acquisition process with the image processing tools of the finding workstations by the same personnel (radiologists) that also implement the later finding generation, and it is ensured that the parameters of the pre-processing are already available in the form of processing descriptions (presentation states) at the point in time of the acquisition of the acquired medical data in the image information system (PACS).

DESCRIPTION OF THE DRAWINGS

Various embodiments of the invention are described in detail below with reference to the following figures.

DETAILED DESCRIPTION OF THE PREFERRED EMBODIMENTS

Figure 1:
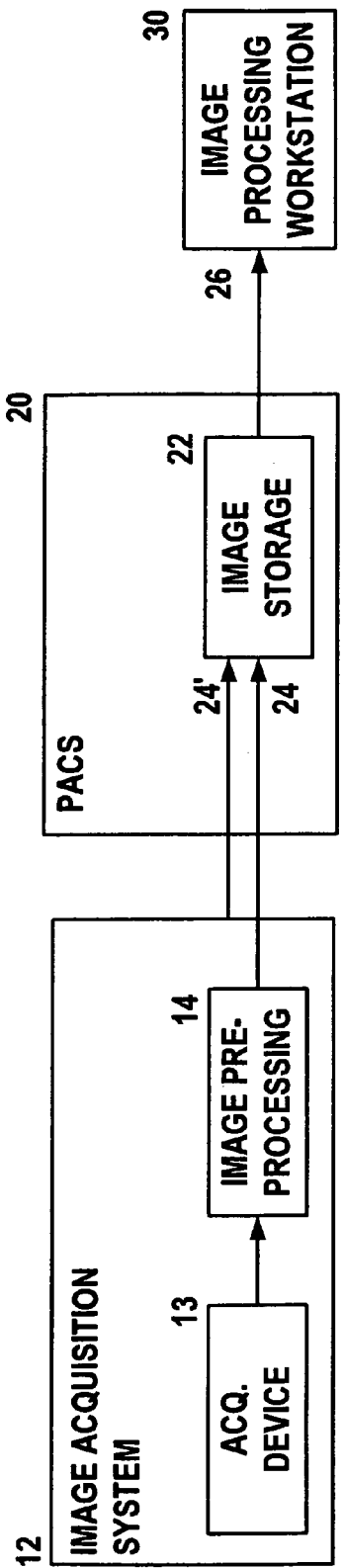
FIG. 1 is a block diagram showing the known image acquisition and processing system.
Figure 2:
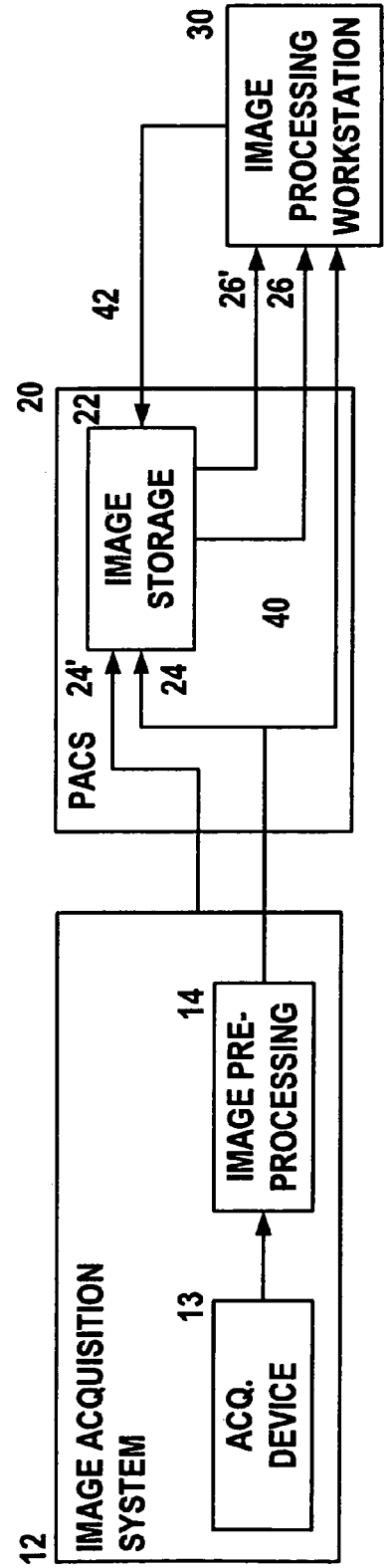
FIG. 2 is a block diagram illustrating an embodiment of the inventive image acquisition and processing system.

As illustrated in FIG. 2, the inventive embodiment is comprised of an image acquisition apparatus 12, an image processing workstation 30 and an image archive and information system (PACS) 20 that are respectively connected with one another via a data network.

The image processing workstation 30 provides the image processing capabilities and enables the generation of image processing descriptions (presentation states) for the medical images shown on the image processing workstation 30. The presentation states describe manipulations of the medical images, e.g. adjustments of contrast/brightness, rotation as well as additional descriptive information as drawings and textual descriptions, highlighting of regions of interest etc. Presentation states do not modify the underlying image, but are rather applied to an image to perform its image processing steps resulting in the final image presentation.

The image acquisition apparatus 12 offers the possibilities to already generate preview images of lower resolution/quality 24 of the directly-implemented acquisition procedure during a running image acquisition by the image acquisition system 12, and to send these preview images 24 to the PACS 20 over the network. A running image acquisition and transfer is defined as occurring during a single imaging session with a patient or subject.

The methods of the generation and transfer of the preview images 24 can preferably ensue with the aid of progressively-coded image compression and image transfer methods such as JPEG2000. Although it is known to store low-res data individually besides high-res data, the present invention includes using a storage format such as JPEG2000 which incorporates low-res data inside the high-res data (multiresolution encoding).

The PACS 20 offers the possibility to simultaneously forward, via a communications apparatus, the data of a running image transfer 40 from the image acquisition apparatus 12 to an image processing workstation 30 and to link image processing descriptions (presentation states) 42 generated by the image processing workstation 30 with the simultaneously-running image transfer 24, and to store them together in an image storage 22 with the high-resolution image exposures 24' that are available later.

The image processing workstation 30 offers the possibility to show preview images from the image data 40 of a simultaneously-occurring image transfer from the image acquisition apparatus (modality) 12, to implement image processing operations with these preview images 40 and to resave the description of the implemented image processing operations as presentation states 42 for PACS even though the image acquisition and image transfer are simultaneously still occurring.

A faster pre-processing of the images by distributed finding workstations 30 is possible with the application of the method. The image processing tools and the capability of the generation of presentation states 42 must be provided at only a single point, the finding/image processing workstation 30. Furthermore, it is no longer necessary to provide personnel on the image acquisition apparatuses 12 who are particularly qualified for image processing; rather, it is possible to simultaneously implement the image pre-processing of a plurality of image acquisition apparatuses 12 from each arbitrary finding workstation 30.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters
12 image acquisition system
13 acquisition device
14 image pre-processing
20 Picture Archival and Communications System (PACS)
22 image store
24, 26 low-resolution image data, preview images
24', 26' high-resolution image data
30 finding/image processing workstation
40 image data from running image transfer
42 presentation states for image data

What is claimed is:

1. A method for simultaneously implementing an image preprocessing and storing of presentation states during an imaging session, comprising:
    acquiring an image with a medical image acquisition device to obtain an acquired image, said acquiring step being performed as all or part of an imaging session;
    performing image pre-processing on the acquired image;
    storing the acquired image in an image storage database in an image storage device during a running image acquisition and transfer for the imaging session;
    simultaneously forwarding the acquired image to an image processing workstation during the running acquisition and image transfer of the imaging session;
    receiving input at the image processing workstation for at least one of adjustments to and additions to and subtractions from the acquired image during the imaging session;
    generating image processing descriptions associated with the acquired image from the input received at the image processing workstation during the running image acquisition and transfer to obtain generated image processing descriptions; and
    storing the generated image processing descriptions associated with the acquired image in the image storage database.

2. The method according to claim 1, wherein the acquired image that is simultaneously forwarded to the image processing work station is of a lower resolution than a high-resolution image of the acquire image that is later stored on the image storage device.

3. The method according to claim 2, further comprising:
    accessing, by the image processing workstation at a time after the running image acquisition and transfer, both the high-resolution image and the image processing descriptions.

4. A system for simultaneously implementing an image preprocessing and storing of presentation states during an imaging session, comprising:
    a medical image acquisition device that acquires an image during an imaging session to obtain an acquired image;
    a pre-processor connected to receive the acquired image from the medical image acquisition device, said pre-processor being operable to perform image pre-processing on the acquired image;
    an image storage database on an image storage device that is connected to receive the pre-processed acquired image from the pre-processor, said image storage database being operable to store the acquired image during a running image acquisition and transfer for the imaging session;
    an image processing workstation connected to receive the acquired image during the imaging session, said image processing workstation being operable to generate image processing descriptions associated with the acquired image; and
    a communication apparatus connected to said image processing workstation and said image storage device; said communication apparatus being operable to simultaneously forwards the acquired image to the image processing workstation during the running image acquisition by said medical image acquisition device of images in the imaging session and transfer of the acquired image to the image storage database;

said image storage device having stored in said image storage database image processing descriptions associated with the acquired image that are generated by the image processing workstation during the running image acquisition and transfer, and these generated image processing descriptions associated with corresponding ones of the acquired image stored in the image storage database.

* * * * *